(12) United States Patent
Sitterlet et al.

(10) Patent No.: US 8,299,401 B2
(45) Date of Patent: Oct. 30, 2012

(54) METHOD AND APPARATUS FOR FORMING A VEHICLE WINDOW ASSEMBLY

(75) Inventors: Charles Sitterlet, Northwood, OH (US); Robert M. Thomas, Sylvania, OH (US)

(73) Assignee: Pilkington Group Limited, St. Helens (GB)

( * ) Notice: Subject to any disclaimer, the term of this patent is extended or adjusted under 35 U.S.C. 154(b) by 282 days.

(21) Appl. No.: 12/821,216

(22) Filed: Jun. 23, 2010

(65) Prior Publication Data
US 2010/0326983 A1   Dec. 30, 2010

Related U.S. Application Data

(60) Provisional application No. 61/269,927, filed on Jun. 30, 2009.

(51) Int. Cl.
*B60L 1/02* (2006.01)

(52) U.S. Cl. .............................. 219/203; 219/202
(58) Field of Classification Search ............ 219/202, 219/203, 600, 634, 635, 636
See application file for complete search history.

(56) References Cited

U.S. PATENT DOCUMENTS

| 4,128,449 A | 12/1978 | Kobetsky |
| 4,256,945 A | 3/1981 | Carter |
| 5,329,085 A | 7/1994 | Cowell |
| 5,977,527 A | 11/1999 | Preston |
| 6,849,837 B2 | 2/2005 | Riess |
| 6,875,966 B1 | 4/2005 | Barber |
| 2008/0164248 A1 | 7/2008 | Reul |

*Primary Examiner* — Hoai V Pham
(74) *Attorney, Agent, or Firm* — Marshall & Melhorn, LLC

(57) ABSTRACT

An apparatus and a method of using induction heating to solder an item of hardware to a glass substrate, wherein the glass substrate; preferably, is a vehicle window, the substrate and bonded item(s) of hardware forming a vehicle window assembly.

16 Claims, 5 Drawing Sheets

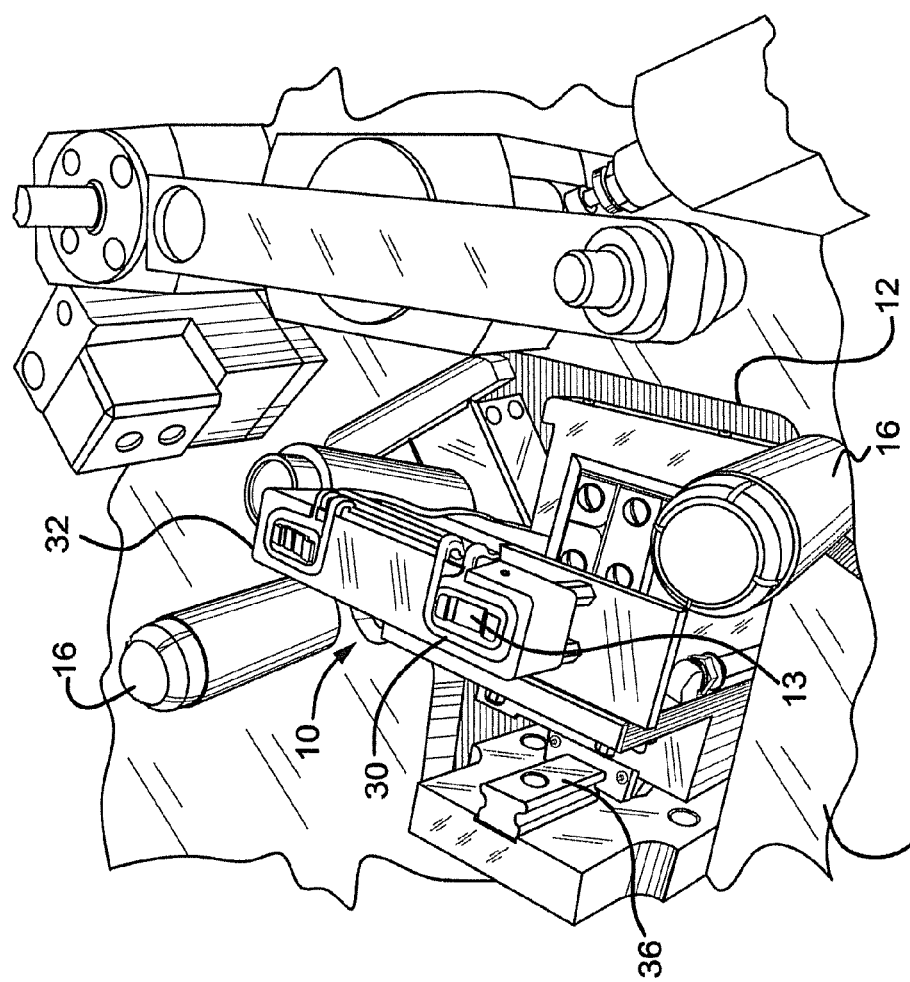

METHOD AND APPARATUS FOR FORMING A VEHICLE WINDOW ASSEMBLY

RELATED APPLICATION

This application is claiming the benefit, under 35 U.S.C. 119(e), of the provisional application filed Jun. 30, 2009 under 35 U.S.C. 111(b), which was granted Ser. No. 61/269,927. This provisional application is hereby incorporated by reference in its entirety.

BACKGROUND

The present invention relates to forming a vehicle window assembly. More particularly, the invention relates to an apparatus for positioning the vehicle window for soldering operations and a method of utilizing an apparatus for soldering an item of hardware to such positioned vehicle window.

Induction heating for soldering has been described in the patent literature, for example:

U.S. Pat. No. 4,128,449 describes a fixture for applying discrete adhesive-backed articles to a support surface through the use of induction heat. Aligning and positioning means are associated with the faces of U-shaped cores to keep the end faces of the core in abutting relationship with the article being heated, but is said to permit the article and core combination to move slightly in a compound direction to accommodate support surface variations or curvature.

U.S. Pat. No. 5,977,527 describes a fixture for an induction brazing station including a removable front plate on which a work piece holder is mounted. The base of the induction unit mounts to a back plate lying coplanar with the front plate on the work surface. The coil of the induction unit is uniquely matched to the front plate and the work piece holder. The induction coil removably mounts to the front plate when not in use such that the front plate may be removed from the work surface with the work piece holder and coil mounted thereon. A different front plate may then be mounted upon the work surface having a different coil configuration and work piece holder.

U.S. Pat. No. 6,875,966 describes a portable induction tool for soldering or brazing sections of metal pipe together. A work coil head (with induction coil) is U-shaped, allowing placement of the head around lengths of pipe, heating a susceptor (e.g. the pipe) to form a joint, and then to be withdrawn after the pipe joint is made.

U.S. Pat. No. 5,329,085 describes a Curie point heater, primarily for use in a soldering iron and initially designed to operate with currents in the megahertz range is restructured to operate in the kilohertz range. In one embodiment of the heater, the coil exciting the heater is mounted in the handle of the iron.

U.S. Pat. No. 6,849,837 describes a method for using magnetic fields to heat magnetically susceptible materials within and/or adjacent to adhesives so as to bond, bind or fasten solid materials to one another. The system uses alternating magnetic fields that induce eddy currents and generate heat within susceptors. An induction heating tool is used to emit the magnetic field at its work coil and an electronic controller measures the energy being used by a power converter that generates the alternating current driving the work coil which creates the magnetic field.

U.S. Pat. No. 4,256,945 describes a heating element consisting of a substrate or core of a non-magnetic material having high thermal and electrical conductivity, clad with a surface layer of a ferromagnetic material of relatively low electrical conductivity. By selecting the proper frequency for energization, by regulating the source to produce constant current, and by selecting dimensions and material parameters for the heating element, temperature regulation in a narrow range around the Curie temperature of the ferromagnetic material can be produced, despite considerable fluctuations in thermal load.

SUMMARY OF THE INVENTION

The present invention relates to an apparatus for and a method of using induction heating to solder an item of hardware to a dielectric substrate, preferably a glass substrate, and more preferably, wherein such glass substrate is a vehicle window, the substrate and bonded item(s) of hardware forming a vehicle window assembly.

It is within the scope of the invention to use one or more induction heating devices integrated into a vehicle window assembly fixture, as an assembly aid or proximate such an assembly fixture. Such assembly fixture or other manufacturing aid which is capable of incorporating an induction soldering operation can be a component of a manual, semi-automated or fully automated manufacturing/assembly process.

The one or more induction heating devices, preferably induction heating coils, can be oriented in a variety of ways with respect to the item to be soldered, so that heat is focused on any of one or both major surfaces of the substrate or the item of hardware to be soldered. The item of hardware preferably has a predetermined amount of solder adhered thereto. Each induction heating device can be operated individually or in selected groups for maximum system flexibility. One or more controllers for controlling the operation of the induction heating devices are also a part of the heating system.

Greatly reduced soldering times over resistance soldering methods and bond strengths better than or equal to resistance soldering are achieved with the apparatus and method of the present invention.

BRIEF DESCRIPTION OF THE DRAWINGS

FIGS. 2a-2b show details of an assembly aid according to the invention.

DETAILED DESCRIPTION OF THE INVENTION

The present invention relates to an apparatus for and a method of using induction heating to solder one or more items of hardware to a vehicle window so as to form a vehicle window assembly.

Figure 1A:
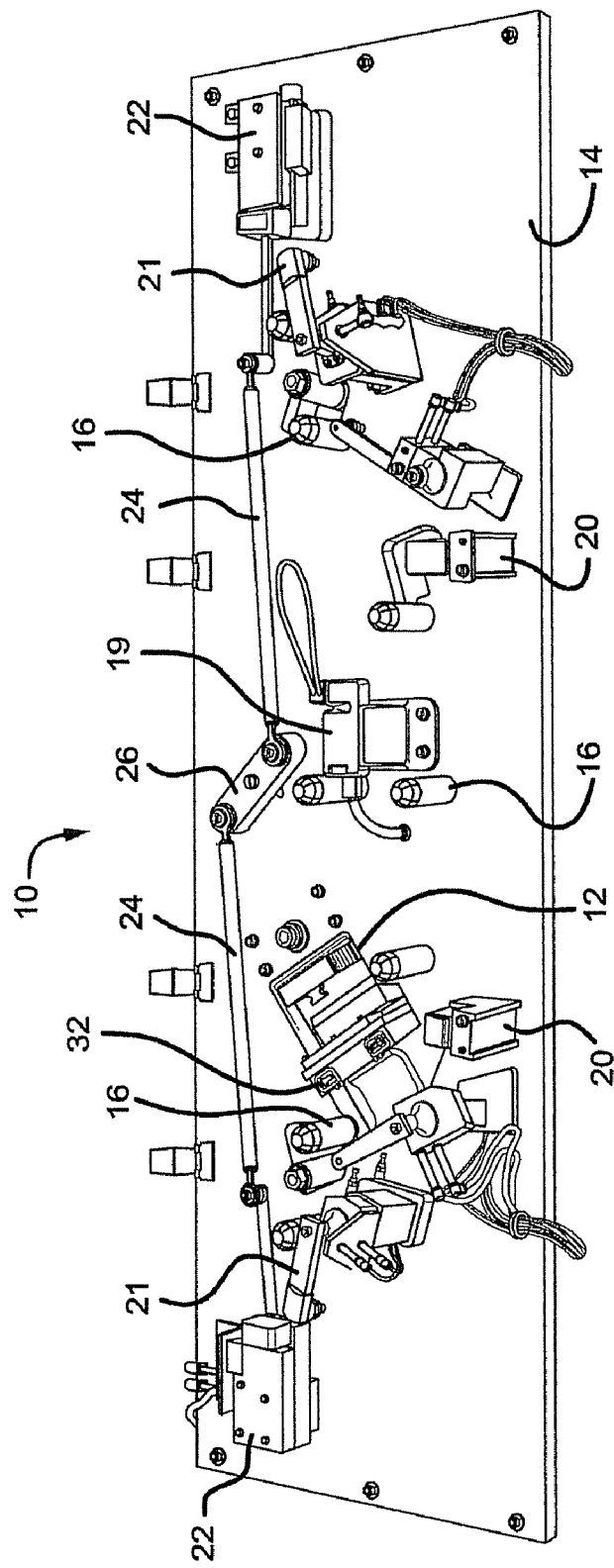
FIGS. 1a-1c show in several views the assembly fixture with assembly aids and with a vehicle window disposed thereon.

FIG. 1a shows an assembly fixture 10 in accordance with the invention having at least one induction heating assembly aid as a component thereof.

Figure 1B:
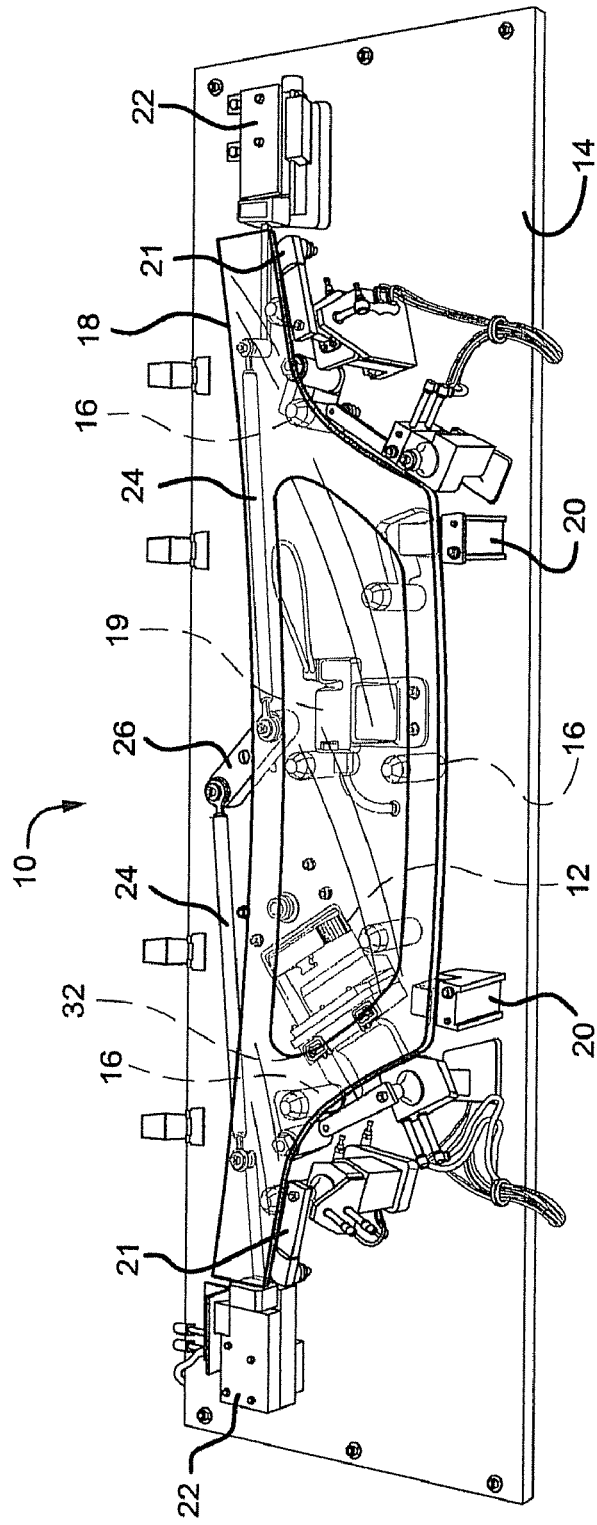
Figure 1C:
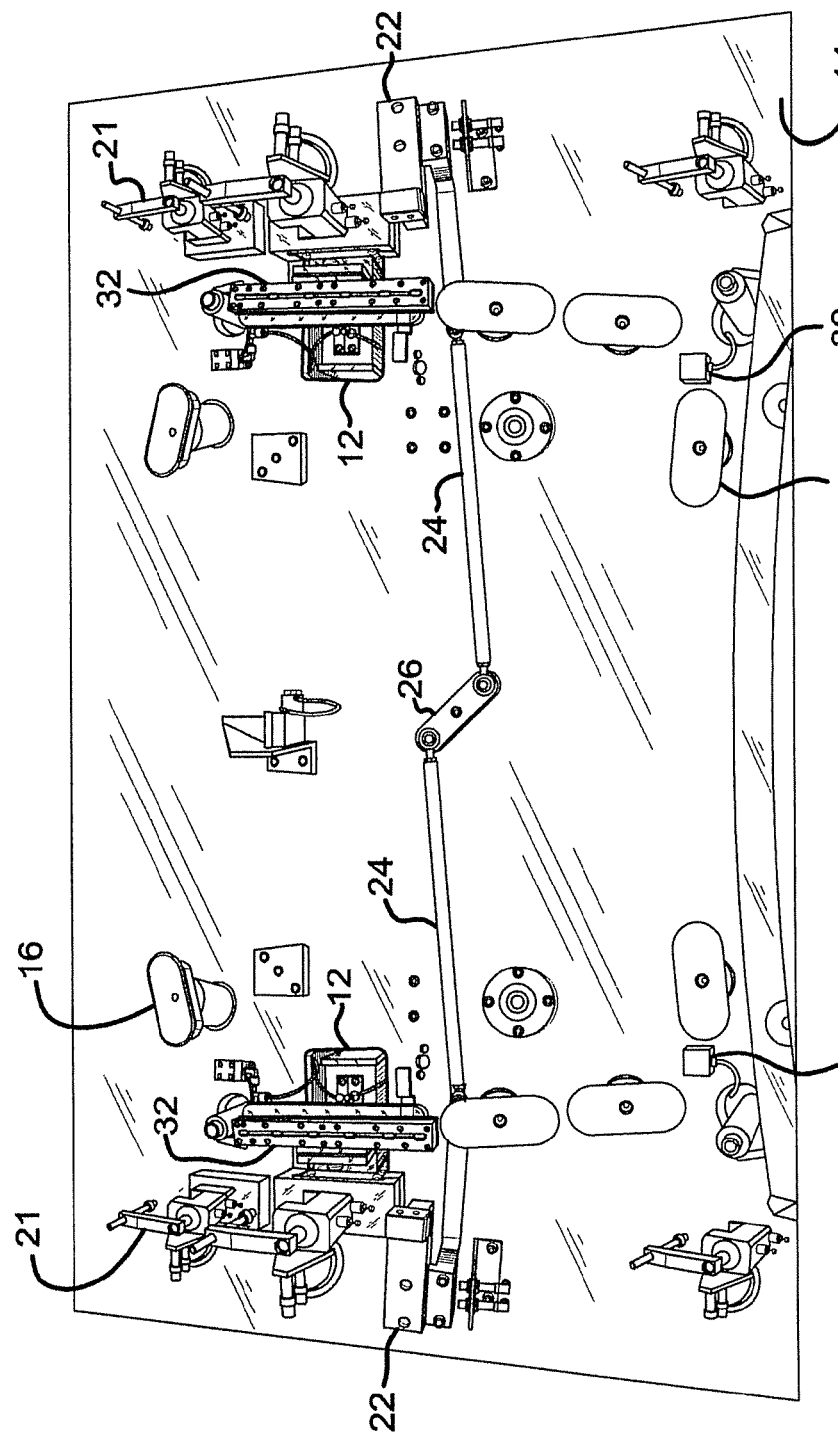

Referring to FIGS. 1a and 1b, the assembly fixture 10 of the invention has a major, preferably substantially horizontal, support surface 14 with at least one preferably resilient, vertical support member 16 attached thereto. The at least one vertical support member 16 supports a vehicle window 18 a predetermined vertical distance above the major support surface 14. As best seen in FIG. 1c, the at least one vertical support member 16 may have a passage extending therethrough, which can be connected to a source of negative pressure, for example a vacuum pump.

Also attached to the major support surface 14, and extending a predetermined vertical distance thereabove, is at least one fixed positioning member 20 to contact the peripheral edge of the vehicle window 18 so as to align the vehicle window in an "x" direction prior to soldering. To assist with aligning the vehicle window 18 in the "y" direction, moveable positioning members 22 may be utilized. Movement of the moveable positioning members 22 is preferably caused by two or more horizontally extending arms 24 which connect the moveable positioning members to a centrally located camming mechanism 26 which is axially affixed to the major support surface 14, although other movement mechanisms are possible.

Other optional features of the assembly fixture as shown in FIGS. 1a and 1b include glass pressure sensor 19 and swing arm mechanisms 21 which when the glass is positioned on the assembly fixture for bonding operations exerts a positive pressure on the vehicle window to assist in maintaining the vehicle window's precise position on the assembly fixture.

Further, one or more assembly aids 12 are affixed to the major support surface in a predetermined location, so as to coincide with the one or more locations on the vehicle window where an item of hardware 13 is to be soldered. The item of hardware 13 is typically metallic, and is preferably formed of steel. In preferred embodiments, the item or items of hardware 13 may be one or more of clips, electrical leads, electrical connectors, and/or electrically conductive braid structures.

Figure 2B:
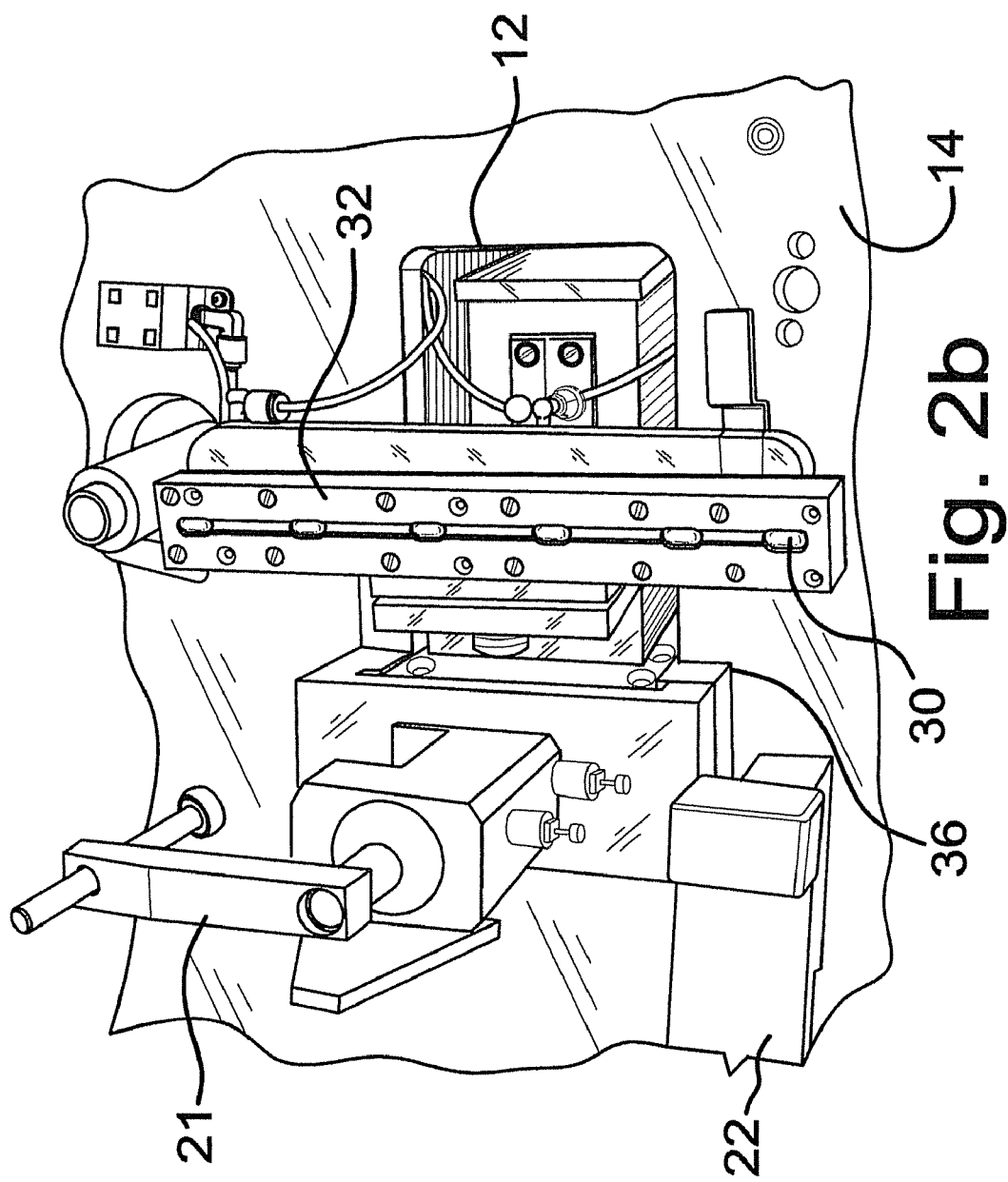

Generally, an assembly aid, illustrated in FIGS. 1a-1c, and in greater detail in FIGS. 2a and 2b, includes a block of temperature-resistant, preferably polymeric material 28 in which is formed a receptacle 30 for receiving one or more items of hardware. Preferably, embedded in the polymeric material 28 proximate the receptacle for the items(s) of hardware 13 is one or more induction heating devices 32 and, if necessary, a cooling system (not shown) that typically employs water or air cooling. The induction heating devices 32 may, of course, be proximate the assembly aid 12, but not embedded in the polymeric material 28. The assembly aid 12 may also be equipped with a spring-loaded or other type of device 36 to allow the assembly aid to move a predetermined distance in a "z" direction. This slight adjustability allows for variation in glass shape.

In a preferred method of operation, a vehicle window 18 is placed onto the assembly fixture 10 by manual or electromechanical means, and is initially positioned on the one or more vertical supports 16 with one peripheral edge of the vehicle window 18 in contact with the at least one fixed positioning member 20. Moveable positioning members 22 are activated to contact opposite peripheral edges of the vehicle window to ensure proper alignment of the vehicle window 18 in a "y" direction. If so equipped, a negative pressure may be applied through the at least one vertical support member 16, thus drawing the vehicle window 18 down so as to contact the surface of the assembly aid 12 and place the surface in communication with the at least one receptacle 30 containing the one or more items of hardware 13 previously placed by manual or electromechanical means in the receptacle 30. Preferably, the one or more items of hardware 13 have a predetermined amount of a solder, preferably a lead-free solder, adhered thereto. The one or more induction heating devices 32 is activated for a predetermined time through at least one electronic controller (not shown) which is connected to a power supply unit (not shown) which, in turn, is connected to the at least one assembly aid 12. Activation of the one or more induction heating devices 32 creates heat sufficient to melt the solder on the portion of the item of hardware 13 which is in contact with the surface of the vehicle window 18. Typically, the solder has a melting temperature $\geq 100°$ C. The induction heating devices 32 are then deactivated by the at least one electronic controller and, after a predetermined time sufficient for the solder to re-solidify and bond the item of hardware to the vehicle window 18, the negative pressure is discontinued. The vehicle window 18 with item(s) of hardware bonded thereto can then be removed from the assembly fixture 10 for further processing, or for transport to, for example, a vehicle assembly plant.

The process of the invention results in advantageously short cycle times, always sought after in time-critical manufacturing processes. Activation times for the one or more induction heating devices are preferably in the range of 2-10 seconds, more preferably, 4-6 seconds. Actual times will vary according to the composition of the solder used and the shape of the item of hardware 13 to be bonded. After deactivation of the one or more induction heating devices, the solder must cool, preferably for 2-10 seconds, more preferably 3-5 seconds for the bond between the item of hardware 13 and the vehicle window 18 to be complete.

The invention has been described in what is considered to be its best mode. Those skilled in the art will, however, appreciate that the invention may be otherwise practiced without departing from the spirit and scope of the invention described herein.

What is claimed is:

1. An apparatus for forming a vehicle window assembly comprising:

an assembly fixture for supporting a vehicle window in a predetermined orientation, the vehicle window having an attachment surface;

at least one fixed positioning member secured relative to the assembly fixture;

at least one moveable positioning member that is moveable into contact with a peripheral edge of the vehicle window to ensure that the vehicle window is in the predetermined orientation on the assembly fixture;

a receptacle for receiving an item of hardware and for holding same in a desired position in contact with the attachment surface of the vehicle window, the item of hardware having an amount of a solder adhered thereto; and at least one induction heating device disposed proximate the item of hardware to supply heat to cause the solder to attain a temperature sufficient to melt and bond the item of hardware to the vehicle window.

2. An apparatus for forming a vehicle window assembly comprising:

an assembly fixture having at least one vertical support member for supporting a vehicle window in a predetermined vertical orientation relative to a major support surface, wherein two or more moveable positioning members are moveable in an x-y plane and are connected to an electromechanical drive mechanism which drive mechanism is attached to the major support surface of the assembly fixture;

one or more assembly aids proximate the major support surface, the assembly aid comprising one or more items of hardware and one or more induction heating devices for heating one or more of, the item of hardware having a predetermined amount of a solder material adhered thereto and the vehicle window, to a temperature sufficient to melt the solder material so as to bond the item of hardware to the vehicle window;

at least one mechanism to bring the vehicle window and the item of hardware into bonding contact;

one or more power supply units electrically connected to the one or more heating devices; and one or more controllers electrically connected to the one or more power supply units.

3. The apparatus for forming the vehicle window assembly defined in claim 2, wherein one or more fixed positioning members are affixed to the major support surface of the assembly fixture, and extend a predetermined vertical distance thereabove.

4. The apparatus for forming the vehicle window assembly defined in claim 2, wherein the two or more moveable positioning members are connected to a first end of at least two horizontally extending arms, the second end of the at least two horizontally extending arms being connected to a camming device, which camming device is affixed to the major support surface of the assembly fixture.

5. The apparatus for forming the vehicle window assembly defined in claim 2, wherein the items of hardware contained in the one or more assembly aids comprises one or more of: clips, electrical leads, electrical connectors, and electrically conductive braid structures.

6. The apparatus for forming the vehicle window assembly defined in claim 2, wherein the solder material comprises a lead-free solder.

7. The apparatus for forming the vehicle window assembly defined in claim 2, wherein the solder material has a melting point at or above 100° C.

8. The apparatus for forming the vehicle window assembly defined in claim 2, wherein the power supply comprises a transformer.

9. The apparatus for forming the vehicle window assembly defined in claim 2, wherein the one or more assembly aids are located in one or more of, the same horizontal plane as the vehicle window, a horizontal plane above the vehicle window, and a horizontal plane below the vehicle window.

10. The apparatus for forming the vehicle window assembly defined in claim 2, wherein the vehicle window is placed on the assembly fixture manually, or by electromechanical means.

11. The apparatus for forming the vehicle window assembly defined in claim 2, wherein the assembly aid is loaded with items of hardware manually, or by electromechanical means.

12. The apparatus for forming the vehicle window assembly defined in claim 2, wherein the mechanism to bring the vehicle window and the item of hardware into bonding contact is a pneumatically-actuated mechanism.

13. A method for forming a vehicle window assembly comprising:
 providing a vehicle window having an attachment surface;
 positioning the vehicle window on an assembly fixture in a predetermined orientation;
 applying a positive pressure, a negative pressure, or both a positive and negative pressure to the vehicle window to ensure that an item of hardware is in contact with the attachment surface of the vehicle window with an amount of solder therebetween;
 utilizing at least one induction heating device supported proximate the item of hardware to supply heat to or near the solder, thereby causing the solder to attain a temperature sufficient to melt the solder; and
 allowing the solder to cool, bonding the item of hardware to the vehicle window and forming a vehicle window assembly.

14. A method for forming a vehicle window assembly comprising:
 providing an assembly fixture having a major upper support surface having one or more openings through which a negative or positive pressure can be applied, the major upper support surface having one or more assembly aids proximate thereto, the assembly aids having located in them, or proximate to them, one or more induction heating devices, and one or more resilient support members affixed to the major support surface, and extending a predetermined vertical distance thereabove;
 providing at least one power supply unit electrically connected to the one or more induction heating devices;
 providing at least one electronic controller electrically connected to the at least one power supply unit;
 loading one or more items of hardware having a predetermined quantity of a solder material adhered thereto, into the assembly aids, so such items of hardware extend a predetermined distance above the major upper support surface;
 placing a vehicle window assembly into supporting contact with the one or more resilient support members;
 applying a vacuum to the vehicle window sufficient to draw a major surface thereof into contact with the one or more items of hardware in the assembly aids;
 activating the power supply via the controller so as to cause the one or more induction heating devices in or proximate to the one or more assembly aids to heat to a predetermined temperature for a predetermined period of time sufficient to melt the solder material on the items of hardware;
 allowing the item of hardware and the solder material to cool for a predetermined time so as to allow a bond to form between the item of hardware and the major surface of the vehicle window, and
 removing the vehicle window assembly from the assembly fixture.

15. The method for forming the vehicle window assembly defined in claim 14, wherein the one or more induction heating devices are heated for a time between 2 seconds and 10 seconds, and the cooling time for the heated solder material is between 2 seconds and 10 seconds.

16. The method for forming the vehicle window assembly defined in claim 15, wherein the one or more induction heating devices are heated for a time between 4 seconds and 6 seconds, and the cooling time for the heated solder material is between 3 seconds and 5 seconds.

* * * * *